United States Patent [19]
Dreher

[11] 3,981,104
[45] Sept. 21, 1976

[54] GRIT BLASTING MACHINE AND METHOD

[75] Inventor: Alfred J. Dreher, Pasadena, Calif.

[73] Assignee: Texstar, Inc., City of Commerce, Calif.

[22] Filed: Mar. 20, 1975

[21] Appl. No.: 560,356

[52] U.S. Cl. .................................... 51/9 M; 51/8 R
[51] Int. Cl.² ...................... B24C 3/06; B24C 9/00
[58] Field of Search ................ 51/8 R, 8 BR, 8 HD, 51/9 R, 9 M; 118/305

[56] References Cited
UNITED STATES PATENTS

| | | | |
|---|---|---|---|
| 1,326,559 | 12/1919 | Ady | 51/9 M X |
| 1,326,560 | 12/1919 | Ady | 51/9 M UX |
| 2,483,176 | 9/1949 | Bishop | 51/9 M X |
| 2,677,461 | 5/1954 | Bodey | 51/9 M X |
| 2,684,558 | 7/1954 | Harris | 51/9 M X |
| 2,818,176 | 12/1957 | Polich | 51/9 M X |
| 3,147,143 | 9/1964 | Kontani | 118/305 |
| 3,756,377 | 9/1973 | Goff | 51/9 M UX |
| 3,858,359 | 1/1975 | Leliaert | 51/9 M |
| 3,877,175 | 4/1975 | Snyder | 51/9 M |
| 3,934,373 | 1/1976 | Leliaert | 51/9 M |

FOREIGN PATENTS OR APPLICATIONS

| | | | |
|---|---|---|---|
| 314,063 | 5/1956 | Switzerland | 51/9 M |

Primary Examiner—Al Lawrence Smith
Assistant Examiner—Gary L. Smith
Attorney, Agent, or Firm—Fulwider Patton Rieber Lee & Utecht

[57] ABSTRACT

A grit blasting machine which projects particles of metal grit, having at least a soft magnetic property, against a surface to be cleaned to remove scale therefrom. The machine includes a vehicle movable along the surface. A housing mounted on the vehicle has an opening facing the surface through which the grit is projected by a throwing wheel mounted within the housing. The grit is picked up by at least one endless belt formed from non-magnetic, magnetically permeable material. The belt is connected with the vehicle and driven peripherally along a closed path having a pickup region and a release region. A plurality of magnets positioned interiorly of the belt cause the grit to become attached to the belt in the pickup region and to be carried to the release region. As the grit on the belt reaches the release region of the path, the grit is separated from the belt and is collected and recirculated to the throwing wheel.

36 Claims, 12 Drawing Figures

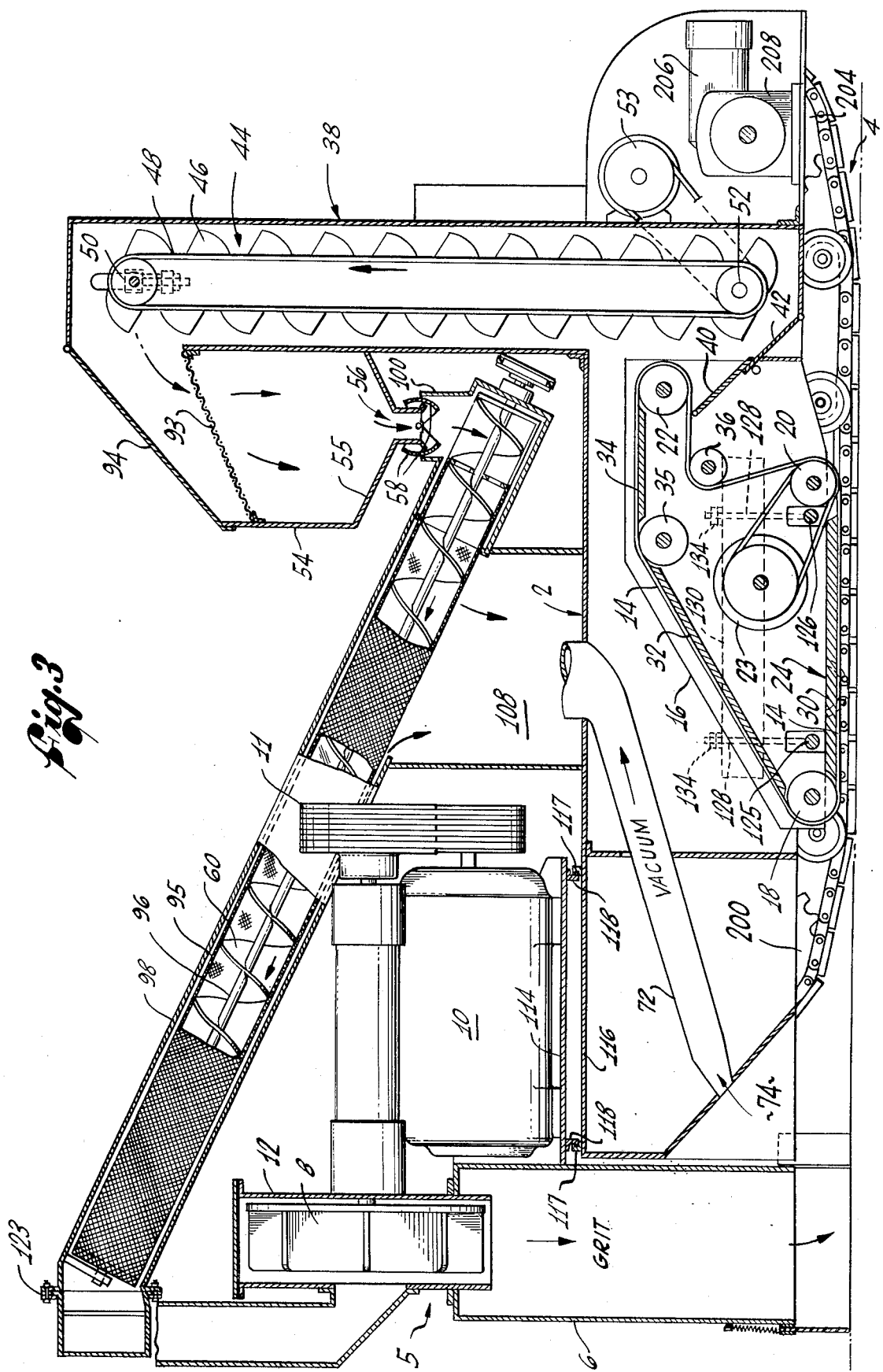

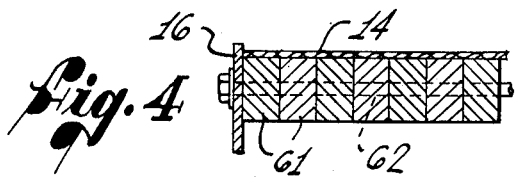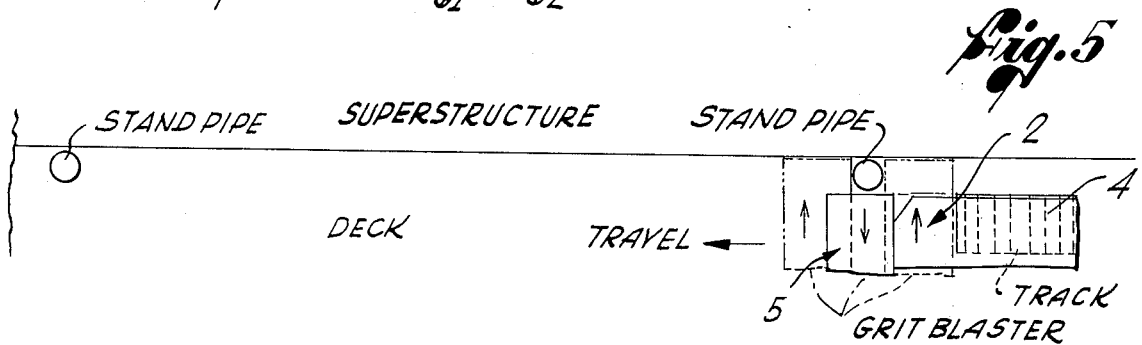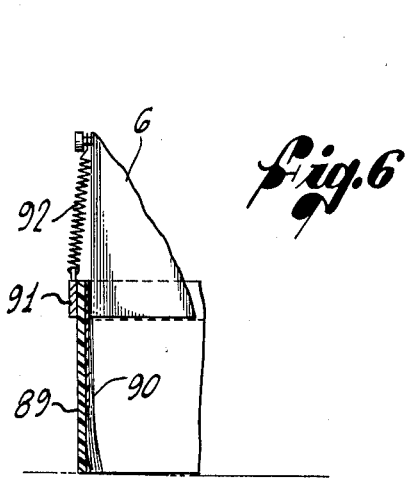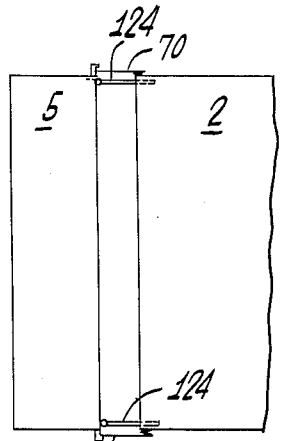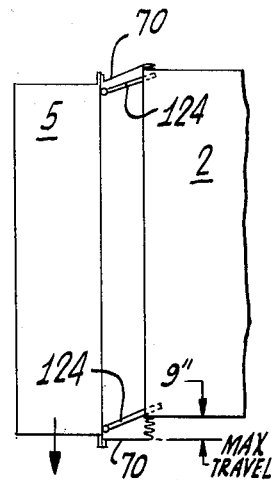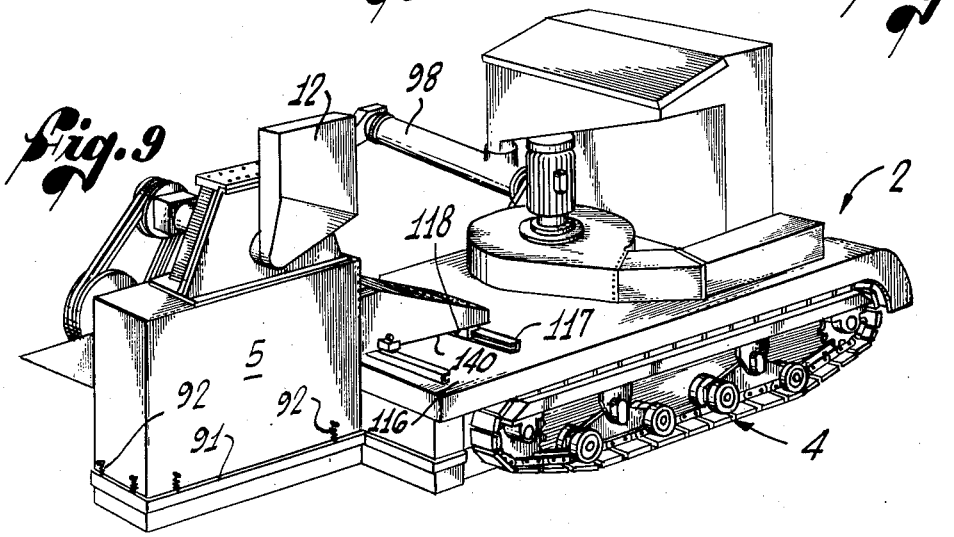

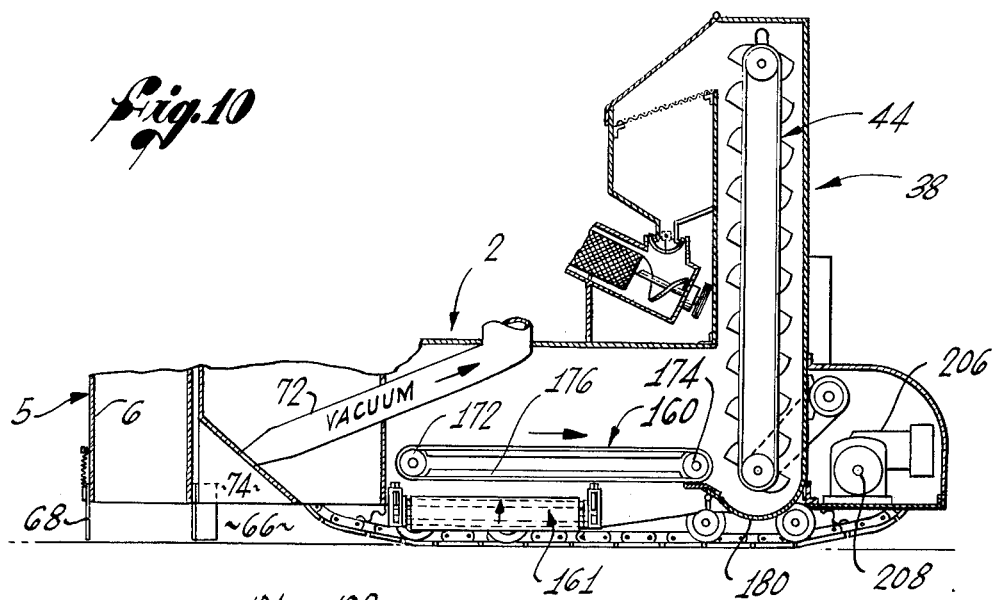
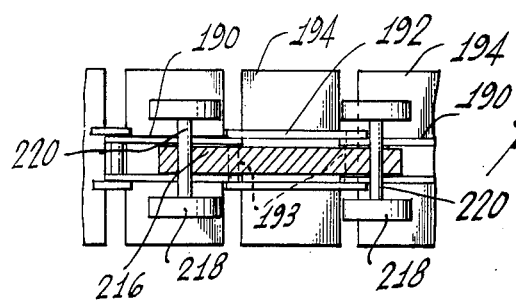
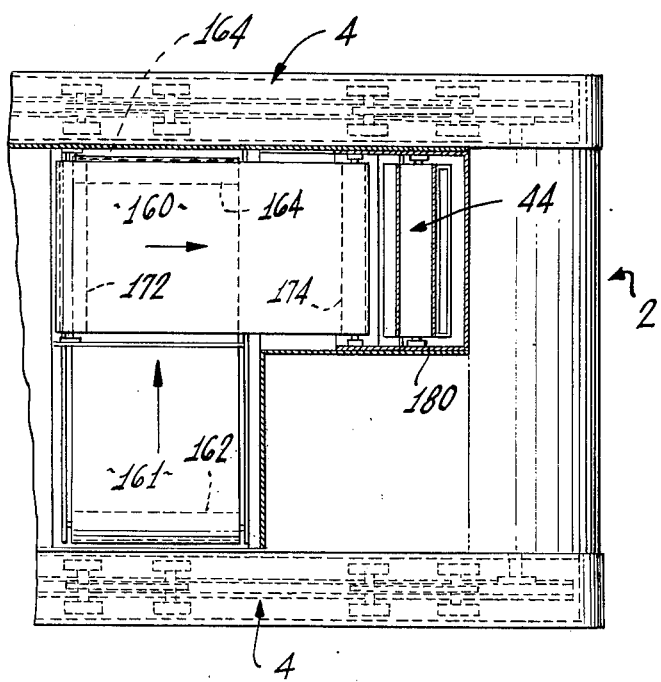

GRIT BLASTING MACHINE AND METHOD

BACKGROUND OF THE INVENTION

This invention relates to a grit blasting machine and method in which particles of metal grit are projected against a surface from which scale is to be removed, with the grit thereafter being recovered and recirculated. In particular, the invention relates to a grit blasting machine and method of the foregoing type in which the grit is recovered by magnetic attraction onto a traveling endless belt positioned within the machine.

In the treatment and preservation of exterior surfaces, such as the decks of ships, and on the highways, etc., it is periodically necessary to clean the surface prior to the application of a suitable coating, e.g., paint. Such cleaning is intended to remove unwanted material on the surface, such as rust, dirt, soot, old paint, and the like, which are collectively referred to hereinafter as "scale". The removal of scale is frequently accomplished by so-called grit blasting machines which project a stream of abrasive metal particles of irregular configuration against the surface at high velocity to detach and remove the scale. To achieve a satisfactory economy in the use of the grit, it has been known to collect the grit and recirculate it. One problem that has become of increasing concern in recent years with the rise in interest in environmental protection measures is to confine the escape of the large quantities of dust that are inevitably generated in the process of grit blasting a scaled surface.

In order to recirculate the grit and minimize the escape of dust, various prior machines have been developed. One such prior machine comprises a vehicle traveling over the surface to be cleaned provided with a housing mounted centrally of the vehicle in which is positioned a throwing wheel for flinging the grit against the surface to be cleaned. A rotating brush following behind the housing and within the interior of the vehicle sweeps up the spent grit and delivers it to a hopper from which conveyors recirculate it to the throwing wheel. A resilient skirt surrounding the lower periphery of the vehicle substantially prevents the escape of dust and grit from the machine and an internal suction system withdraws the dust, subjects it to the action of a dust separator, and collects the dust in a dust collector.

Another type of prior machine, which also includes a traveling vehicle, a throwing wheel, a resilient confining skirt and a dust extraction system, utilizes a rotating magnetic drum to pick up the spent grit. The grit is scraped from the rotating magnetic drum by a blade and falls into a hopper from which it is recirculated to the throwing wheel.

Although generally satisfactory, such prior machines can be subject to certain problems. In both prior machines described, frictional contact is involved in transferring the spent grit to the collecting hopper from which it is recirculated, i.e., either the frictional contact that occurs between the rotating brush and the spent grip particles lying on the surface or the frictional contact that occurs between the scraper blade and the grit particles adhered to the surface of the magnetic drum. Because of the highly abrasive nature of the metallic grit, replacement is inevitably needed in the region where the frictional contact occurs. Such replacement may, for example, be necessitated every four or five hours of operation, thereby leading to unacceptable down time in addition to the direct replacement and maintenance costs involved.

Another problem with the prior machines could occur in conducting cleaning operations on a flat surface (such as a deck) bounded by a vertical wall (e.g., a bulkhead) when there are standpipes or the like adjacent the vertical wall. Because of the standpipes, the vehicle cannot be traversed snug against the wall, but must be spaced from it by at least the width of the standpipe, leaving an unblasted region which must be cleaned by other means. It would be desirable to have a machine in which the blasting head could be shifted laterally in relation to the direction of the travel of the machine. Such a traverse capability would enable the wheel to be positioned closely adjacent the vertical wall and withdrawn laterally to clear a standpipe when necessary.

Other problems of such prior vehicles are associated with the location of the throwing wheel and housing in the center of the vehicle. Because of the central location, it is not possible to position the blasting head really close to a vertical wall because the throwing head is necessarily spaced away from the wall by at least the intervening portions of the vehicle. Moreover, the positioning of the throwing wheel and housing in the center of the vehicle requires complicated maintenance and removal procedures when it is necessary to remove and replace the throwing wheel after it has become worn.

SUMMARY OF THE INVENTION

A grit blasting machine and method according to the preferred embodiment of the invention is intended to provide for recovery and circulation of spent grit in a manner which substantially reduces wear of the machine parts due to frictional contact with the spent grit during recovery, thereby minimizing replacement and maintenance costs and expensive down time. In addition, the machine is provided with a capability for moving the blasting head of the machine laterally relative to the remainder of the machine so that it can be operated along the edge of a horizontal surface bounded by a wall even though there may be standpipes positioned adjacent the boundary between the horizontal surface and the wall.

The reduction of frictional contact between the parts of the machine and the spent grit during recovery is achieved in the present invention by using at least one endless belt to pick up the grit by magnetic attraction and convey the grit to a release region where the grit is separated and subsequently recirculated to the blasting head. The grit is metal grit having at least a soft magnetic property. The term "soft magnetic property" indicates a metal or alloy which is susceptible to magnetic attraction but which does not exhibit substantial permanent magnetic retentivity itself after the magnetizing influence has been removed. By the use of the magnetic pickup which does not require a direct scraper blade or the like to remove the grit from the belt, there is effectively no frictional contact between the grit and the pickup system.

In more detail, a grit blasting machine constructed in accordance with the invention includes a vehicle movable in a forward direction along a longitudional path over the surface to be cleaned. A housing, comprising a grit blasting head, is mounted on one longitudinal end of the vehicle and has a downward opening facing the surface. A throwing wheel is mounted within the housing and centrifugally projects the grit downwardly through the opening against the surface to remove the scale therefrom. Positioned within the interior of the vehicle is at least one endless belt formed form nonmagnetic, magnetically permeable material. Suitable supporting structure supports the belt in an endless path and drives it peripherally along the path. The path includes a pick-up region facing towards the surface in spaced adjacent relation to it and also includes a release region. Continued motion of the vehicle moves the pickup region successively over the same portions of the surface traveled over by the housing. Magnets connected to the vehicle magnetically attract grit, present on the surface facing the pick-up region, onto the belt and hold the grit on the belt until the grit reaches the release region. The portions of the belt passing through the release region are not subjected therein to sufficient magnetic force to hold the grit on the belt by magnetic attraction. The grit is caused to become separated from the belt during passage through the release region. The grit separating from the belt is collected and recirculated to the blasting means.

It will be appreciated that by the foregoing structure, the spent grit is picked up from the work surface, recovered and moved from the pickup region to the release region where it is separated, without requiring frictional contact with the grit. As a result, the opportunity for the grit to cause abrasion and wear of the structure by which the grit is picked up and recovered, is substantially avoided.

The machine also includes provision for preventing the escape of the large quantities of dust that are thrown up during shot cleaning operations. For this purpose, a peripherally extending, resilient skirt is mounted about the lower periphery of the vehicle extending into contact with the ground to confine the escape of dust, grit and scale. Suction is applied to the interior of the vehicle, which communicates with the interior of the housing, to withdraw the dust created. The dust is subjected to the action of a centrifugal separator and is collected in a dust collector vehicle towed by the main vehicle. With the structure described, air pollution is greatly reduced.

Another important feature of the machine resides in the use of a blasting head which can be moved transversely of the vehicle. With such a construction, it is possible to use the vehicle to clean a horizontal surface, such as a deck, right up to its boundary with a vertical wall or bulk head, even despite the presence of standpipes and the like along the boundary between the surface and the wall. Because of the ability to traverse the blasting head, it can be moved over laterally relative to the vehicle to extend beyond the vehicle tracks into close relation to the wall. When forward motion of the vehicle brings the blasting head into contact with a standpipe, the blasting head can then be moved transversely to clear the standpipe so that the vehicle can resume its forward motion. Once the standpipe has been passed, the blasting head can be moved transversely again back into close relation to the wall.

The mounting of the blasting head on one longitudinal end of the vehicle is also a significant advance over prior machines in which the blasting head was mounted in the middle of the vehicle. With an end mounted blasting head, it is a simple matter to remove and replace the blasting head, comprising the housing, throwing wheel and throwing wheel motor, as a single unit, merely by traversing it to its extreme side position until it separates from its bearings and then sliding a replacement blasting head on the bearings into position. Prior machines with the head mounted amidships required extensive engineering work to effect replacement of a worn out blasting head.

In addition, the fact that the housing and blasting wheel are mounted at the end of the vehicle allows the machine to blast clean the surface much closer to an end wall or the like than is possible with a machine in which the blasting head is mounted in the center of the vehicle. In the latter case, the closest the blasting head can approach the edge of the surface to be cleaned is determined by the dimensions from the midpoint of the vehicle to the outer peripheral edge portion of the vehicle which comes into contact with the vertical wall.

The foregoing, and other advantages and features of the grit blasting machine and method of the present invention, are described more fully in the detailed description which follows:

BRIEF DESCRIPTION OF THE DRAWINGS

A grit blasting machine constructed in accordance with the invention, is illustrated in the accompanying drawings in which:

FIG. 3 is a cross-sectional side view of the grit blasting machine shown in FIG. 2;

FIG. 4 is a cross-sectional view on an enlarged scale of a plurality of permanent magnets, forming a part of the grit blasting machine;

FIG. 5 is a simplified top view illustrating the use of the grit blasting machine shown in FIG. 1 to clean the peripheral region of a deck bounded by a vertical superstructure having standpipes extending into the deck region;

FIG. 6 is a cross-sectional end view on an enlarged scale of a portion of a resilient skirt surrounding the grit blasting machine to prevent the escape of dust and grit;

FIGS. 7 and 8 are simplified top views of a forward end portion of the grit blasting machine illustrating the capability of the machine to move a blast head forming a part of the machine laterally in order to clear a standpipe or other obstruction on the surface being cleaned;

FIG. 9 is a perspective view of a second embodiment of the grit blasting machine utilized as a line-striping machine for removing the painted lane markings on a highway;

FIG. 10 is a cross-sectional side view of a portion of a third embodiment of the grit blasting machine;

FIG. 11 is a cross-sectional top view of a portion of the third embodiment of the grit blasting machine shown in FIG. 10; and FIG. 12 is a cross-sectional plan view on an enlarged scale of a track bogie utilized in all these embodiments of the invention.

DETAILED DESCRIPTION

Figure 1:
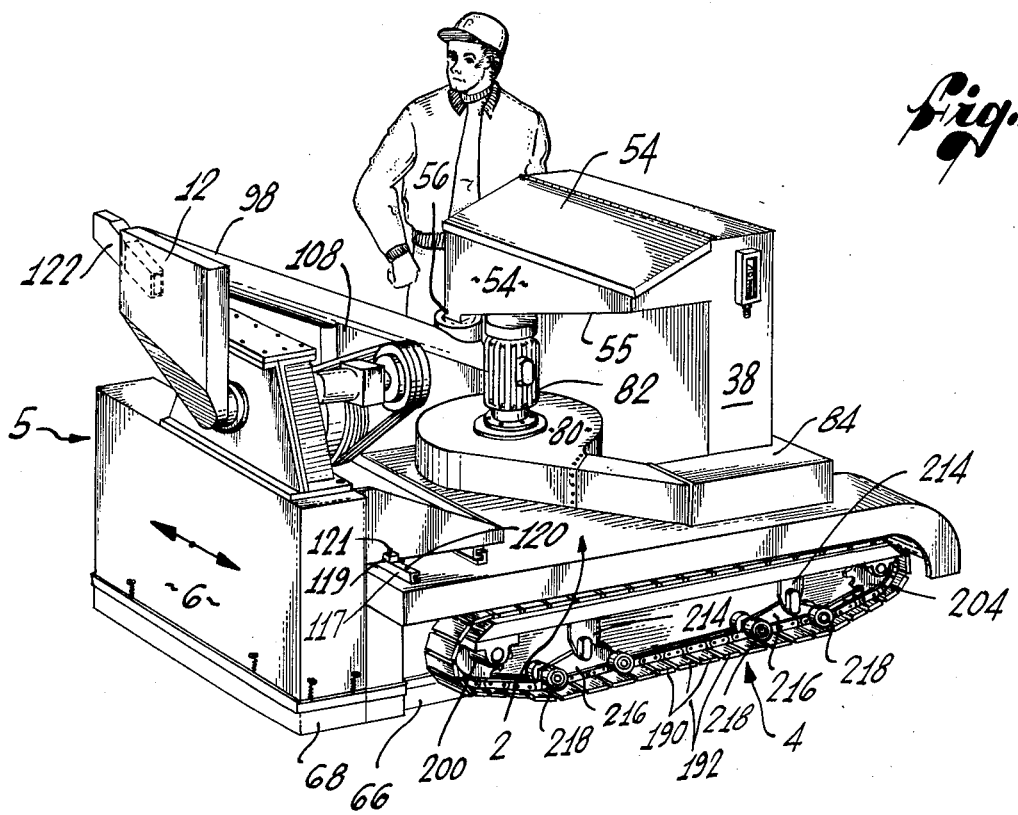
FIG. 1 is a perspective view of the grit blasting machine constructed according to the preferred embodiment of the invention.
Figure 2:
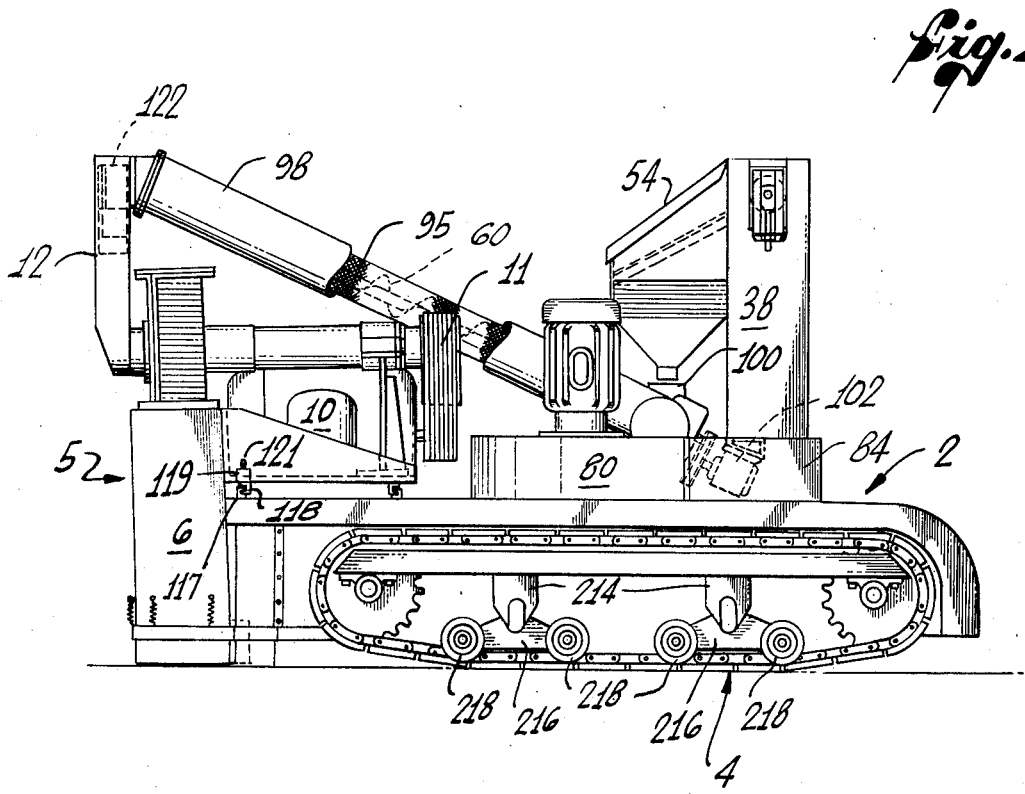
FIG. 2 is a side view, partially in crosssection, of the grit blasting machine shown in FIG. 1.

Referring to FIG. 1 of the drawings, a grit blasting machine constructed in accordance with the preferred embodiment of the invention is there illustrated. The machine includes a generally rectangular vehicle 2 supported for motion in a longitudinal direction by two track assemblies 4. Mounted on the forward longitudinal end of the vehicle is a blasting head 5 comprising a generally rectangular, vertically and transversely extending housing 6 within which is positioned a throwing wheel 8 (FIG. 3). The throwing wheel is mounted for rotation about a horizontal, longitudinally extending axis and is driven by an electric motor 10 via an adjustable belt and pulley drive 11 by which the speed of the throwing wheel can be varied in increments dependent upon the ratio of pulleys selected. Particles of metallic grit having a soft magnetic property are fed into the wheel 8 through an inlet box 12 and are flung downwardly by centrifugal force where they strike the surface to be cleaned and detach scale from it. The housing and throwing wheel are inclined at a slight angle (selectively adjustable between 3° and 7° in the preferred embodiment) forwardly from the vertical, as best shown in FIG. 2, so that the rebounding grit will travel towards and beneath the rear end wall of the housing.

Of particular interest in the context of the present invention is the provision of pickup structure for picking up the spent grit and returning it for reuse. The pickup structure (FIG. 3) includes an endless flexible belt 14 of non-magnetic, magnetically permeable material such as sheet synthetic rubber. The belt has a width at least coextensive with the transverse width of the housing 6 and, in the preferred embodiment, a few inches wider. The belt 14 is supported by a plurality of transversely extending, horizontal rollers rotatably supported at their extremities in a frame comprising two vertical, sidewalls 16. The rollers include two longitudinally spaced, forward and rear lower rollers 18 and 20 having their centers positioned at an equal vertical spacing above the surface to be cleaned. Spaced above the lower rollers 18 and 20 and behind the lower roller 20 is an upper, additional roller 22. Driving motion is imparted to the rear, lower roller by an electric motor 23, via a conventional belt drive, to drive the belt 14 in a fixed path around the rollers moving in a direction from the rear lower roller 20 around the forward lower roller 18 towards the upper roller 22.

The fixed path along which the endless belt 14 moves, includes a pick-up region 24 extending between the forward and rear lower rollers 18 and 20, an intermediate region extending between the forward lower roller 18 and the upper roller 22, and a release region in which the belt 14 is moving downwardly around the adjacent portion of the periphery of the upper roller 22. A horizontal, longitudinally and transversely extending first magnet 30 in positioned in closely overlying relationship to the belt 14 in the pick-up region 24 and has a high magnetic field strength.

During movement of the machine forwardly over the work surface, it will travel over spent grit left on the surface by the throwing wheel, and the high field strength of the magnet is sufficient to cause these spent particles of grit to become attached magnetically to the exterior of the magnetically permeable belt 14. The forward lower roller 18 is also of magnetic material and is magnetized to the high field strength value so that the particles of grit remain magnetically attracted to the belt as it passes around the forward lower roller. The grit particles are also retained on the belt by magnetic attraction as it passes through the intermediate region to the deposit region by first and second intermediate magnets 32 and 34 also disposed in closely spaced relation to the adjacent interior surfaces of the belt 14 and connected to the frame sidewalls 16.

Positioned between the first and second intermediate magnets with its center on a vertical level with the center of the upper roller 22 is a first intermediate roller 35 extending transversely between the sidewalls in contact with the interior surface of the belt 14. A second intermediate roller 36 is positioned between the upper roller 22 and the rear lower roller 20 with its uppermost peripheral point contacting the exterior of the belt 14 on a vertical level with the lowest peripheral point of the upper roller 22. The effect of the first and second intermediate rollers is to contour the fixed path of the belt around the upper roller in a U with the arms of the U extending horizontally, thus providing a sharply defined release region.

The first intermediate magnet 32 is of the same high field strength throughout its length as the pickup magnet 30 but the second intermediate magnet 34 changes in magnetic field strength along its length from the high value adjacent its upstream end (in the direction of motion of belt travel) to a low value adjacent the upper roller 22. The low field strength is less than that necessary to retain the grit on the belt. The upper roller 22 is not magnetized so that, as the grit particles travel around it on the belt while passing through the release region, the grit particles become separated from the belt under the combined influence of gravity and centrifugal force and fall downwardly.

The grit separating from the belt 14 in the release region of the belt path falls into the bottom of a vertical, generally rectangular conveyor casing 38. The closed lower end of the conveyor casing 38 constitutes a collector for the grit which is directed into the casing by an inclined pair of plates 40 and 42 arranged in overlapping sliding relation. The grit accumulating in the bottom of the conveyor casing 38 is carried upwardly within the casing by a vertically mounted bucket conveyor 44 comprising a plurality of conveyor buckets 46 mounted on a flexible endless belt 48. The belt passes over upper and lower rollers 50 and 52 with an electric motor 53 driving the lower roller 52 via a belt drive. The buckets 46 are configured to exert a forward throwing motion to the contents as they empty on movement past the upper end of travel, thereby directing the grit into a closely adjacent, vertical hopper 54 mounted on the forward side of the conveyor housing 38. The hopper has a bottom wall 55 which slopes downwardly in a transverse direction from left to right and is provided with a bottom opening 56 at its right end (FIGS. 1 and 3). Passage of grit through the opening 56 is controlled by a pair of clam shell doors 58 connected with adjacent portions of the hopper and pivoted between open and closed positions by an electric solenoid (not shown). Grit leaving the hopper 54 through the opening 56 when the clam shell doors 58 are open in conveyed back to inlet box 12 for the throwing wheel 8 by the forwardly and upwardly inclined screw conveyor 60.

The magnet units 30, 32 and 34 (FIG. 4) each comprise a plurality of transversely extending, bars 61 superstructure permanently magnetized metal mounted in abutting, side-by-side relation. The bars are held in position by tie rods 62 extending through the magnets 61 and connected at the opposite transverse ends to the side walls 16 constituting the frame. The belt 14 runs over the outer surfaces of the various bars 61. In the preferred embodiment, permanent magnet material, capable of being permanently magnetized to the high degree fo magnetic field strength, is utilized for the bars 61.

The foregoing arrangement provides for economical recirculation of the grit. In achieving recirculation, the function of picking up the grit from the work surface and transferring it to the recirculation conveyors 44 and 60 is accomplished by the endless belt 14 which performs this function without requiring any physical scraping, brushing or other frictional contact with the grit. The elimination of frictional contact with the grit achieved by the use of a magnetic pickup which is decreased in the release region of the belt to permit the grit to detach, reduces the rate of wear on the grit pickup assembly in comparison with prior pickup assemblies which utilized rotating brushes or scraper blades to effect pickup and transfer of the grit from the work surface being cleaned to a recirculation conveyor system. As a result, maintenance and replacement costs and the attendant amount of down time can be substantially reduced.

Substantial amounts of dust are created in grit blasting operations and the present machine minimizes the escape of dust and grit into the surrounding atmosphere. The vehicle 2 (FIG. 3) itself is of generally box-like configuration having a closed, generally horizontal superstructure and front and rear end walls and sidewalls extending downwardly towards the surface, to define an interior space enclosed at the top and sides and ends. A resilient vertical skirt 66 (FIG. 1) extends peripherally about the sidewalls and rear end wall of the vehicle 2 into sliding contact with the surface being cleaned and thus reduces escape of dust and grit from the interior space within and beneath the vehicle. A similar resilient skirt 68 is mounted on and extends peripherally around the base of the housing 6 along its forward transverse end and both sidewalls. At the junction between the housing 6 and the vehicle 2, two transversely spaced, vertically extending bellows 70 (FIGS. 7 and 8) are provided extending between the skirt 68 on the housing and the skirt 66 on the vehicle. The skirts 66 and 68 and the two bellows 70 collectively provide a complete peripheral skirt minimizing escape of dust and grit from the interior space within and beneath the vehicle 2 and from the interior of the housing 6.

To draw off the confined dust, suction is applied to a suction inlet pipe 72 (FIG. 3) extending into the interior of the vehicle. At its forward lower end, the suction inlet pipe 72 communicates with an internal plenum chamber 74 extending longitudinally and transversely between the housing 6 and the endless belt 14. The suction applied to the plenum chanber 74 extends throughout the entire interior surface of the vehicle and the housing so that airborne dust is continuously withdrawn through the suction inlet pipe. The air withdrawn is replaced by air passing in an inward direction beneath the bottom of the skirt and such inward flow of air further resists the opportunity for dust to escape out into the atmosphere.

At its upper, rear end the suction inlet pipe 72 (FIG. 3) passes outwardly through the superstructure of the vehicle 2 to the inlet side of a horizontally mounted centrifugal pump 80 (FIG. 1) mounted on the upper surface of the vehicle and driven by an electric motor 82. The outlet from the pump passes to a collector duct 84 which is connected by a flexible hose (not shown) to a dust collector vehicle. The dust collector vehicle (also not shown) comprises a wheeled trailer vehicle hitched to and towed by the vehicle 2 provided with a centrifugal separator for separating the dust from the air and a collector bag for receiving the collected dust.

To assist the resilient skirts 66 and 68 in withstanding the abrasive effects of the rebounding grit, each skirt possesses the construction shown in FIG. 6. The skirt comprises an outer skirt 89 of synthetic rubber or other elastomeric sheet material. The outer skirt 89 is formed from relatively thick sheet material (e.g., ¼ inch to ½ inch thickness) and has sufficient weight and stiffness to maintain its position providing a vertical seal. To protect the outer skirt against abrasion by the rebounding grit, it is provided on its inner surface with brush-like inner skirt 90 comprising a plurality of vertically extending resilient plastic bristles. The bristles of the inner skirt 90 cushion the impact of the rebounding grit particles so that they do not impinge at high velocities on the outer skirt 89, thus extending the life of the outer skirt.

To support the skirts, each outer skirt 89 is provided, along its upper peripheral region, with a continuous metal band 91. The bristles of the inner skirt 90 are held together at their upper ends to form a continuous strip, by a crimped-over, peripherally extending metal strip. The outer and inner skirts 89 and 90, including the band 91 and the strip joining the upper ends of the bristles, are all secured together by rivets, bonding or other conventional means. A plurality of peripherally spaced vertically extending springs 92 releasably connect the band 91 to the (FIG. 2) adjacent end and sidewalls of the housing and the vehicle. By releasing the band 91 from its springs, the skirts, when they become worn, can be removed from the machine and replaced with new ones, when necessary.

In addition to removing the dust, it is also necessary to separate fine dust particles and particles of separated scale mingled with the grit. To remove particles of scale which are larger than the grit particles, a first mesh screen 93 is mounted over the open upper end of the hopper 54. The screen 93 has a mesh size approximately equal to that of the grit particles so that the grit passes through the screen, but particles fo scale larger than the grit are retained on the upper surface of the screen. Periodically, a hinged lid 94 covering the hopper 54 can be raised to permit the particles of scale on the surface of the screen 93 to be removed.

It is also necessary to remove the fines which are particulate matter of smaller size than the grit, such as dust and scale and damage grit particles because it is an inefficient use of the throwing wheel to project particles which are too light to have an appreciable scale removing effect impact against the surface to be cleaned. To remove the fines from the grit, a second screen 95 is provided. The previously mentioned screw conveyor 60 is mounted on a central shaft 96 which is mounted for rotation within a stationary tubular casing 98. The casing 98 communicates at its forward upper end with the inlet box 12 to the throwing wheel and is connected at its lower end to adjacent portions of the vehicle 2 underlying the hopper 52. A connecting conduit 100 guides grit from the hopper 54 into the interior of the casing 98 when the clam shell doors 58 are open. The second mesh screen 95 is of tubular configuration extending around and connected to the flights of the screw conveyor 60. If so desired, however, the machine can be utilized without the tubular second screen 95.

The shaft 96 of the screw conveyor 60 is rotated by an electric motor 102 (FIG. 2) via a belt and pulley drive in a direction to advance the grit vertically along the tube and into the inlet to the screw conveyor, and during this passage, the grit is conveyed within the interior of the second mesh screen 95. The mesh size of the screen 95 is somewhat smaller than that of the grit particles so that the grit is retained while the fines fall through the second mesh screen, slide down the interior of the casing 98, and pass out through an opening in the underside of the casing into an enclosed, generally rectangular collecting bin 108 (FIGS. 1 and 3) which is periodically emptied through an access opening (not shown).

It will be appreciated that the screening out of the large particles of scale accomplished by the first mesh screen 93 and the subsequent screening out of the fines by the second mesh screen 95 causes the material being recirculated to the throwing wheel 8 to consist substantially fo grit particles of the same size as the grit originally projected. From time to time, additional new grit will be placed in the hopper 54 to replace the grit which is inevitably lost and destroyed as grit blasting operations continue.

The grit blasting machine incorporates a provision for moving the blasting head 5 transversely relative to the vehicle 2 so that it can extend on either side of the vehicle, as selected, projecting laterally beyond the adjacent one of the tracks 4. This capability is valuable in grit blasting surfaces bounded by a vertical wall where there are projections extending along the wall at intervals. For example, as shown in FIG. 5, in cleaning a deck of a naval vessel, there may be standpipes spaced at intervals along the boundary between the deck and an adjacent vertical bulkhead. These standpipes make it necessary that the track 4 of the vehicle closest to the bulkhead be spaced away from the bulkhead by at least the diameter of the standpipe. If the grit blasting head 5 should be fixedly aligned as in prior machines, so that its transverse boundary coincides with the outer extent of the track 4, this would necessitate leaving an uncleaned strip of deck along the peripheral edge of approximately the width of one standpipe. However, with the present grit blasting machine, the head can be traversed over to a position in close relation to the wall to prevent the creation of such a wide strip of uncleaned deck. When the machine reaches the standpipe, the blasting head can be moved transversely to clear the head as the vehicle continues its forward path, and after the standpipe has been cleared, the head can be moved transversely back against the bulkhead (FIG. 5).

To enable the blasting head to traverse, the housing 6 is provided on its rear side with a rearwardly extending, horizontal wall 114 (FIG. 3) extending in a generally longitudinal and transverse direction rearwardly from the housing. Suitable bracing structure is provided between the horizontal wall 114, on its upper side, and the housing for the blasting head. The previously mentioned driving motor 10 for the throwing wheel is fixedly mounted on the upper surface of the supporting wall 114.

The wall 114 is spaced above and parallel to a supporting wall 116 forming a part of the superstructure of the vehicle 2 in spaced, parallel underlying relation to the wall 14. Mounted on a supporting wall 116 are two spaced parallel guide tracks 117 (FIGS. 1 and 3). The guide tracks are of rectangular U-shaped cross-section provided with horizontal inwardly facing channels which slidably engage oppositely facing, transversely extending, U-shaped slide rods 118 fixedly secured to the underside of the horizontal wall 114. The guide tracks 117 and the slide rods 118 thus mount the blasting head for traversing motion relative to the vehicle. Connected to the exterior bracing attached to the wall 114 is a rectangular pin holder 119 (FIGS. 1 and 2) which slides over one of the guide tracks 117 in alignment with it. A vertical hole through the pin holder 119 can be aligned with one of three vertical pin holes 120 (only the extreme left one of the holes 120 is visible in FIG. 1) provided at spaced intervals along the underlying guide track 117. A releasable locating pin 121 can be slid vertically through the holes in the pin block and a selected one of the three holes 120 in the guide track to position the blasting head in one of three possible selected transverse positions relative to the vehicle. The positioning of the three holes 120 provides three possible selected positions of the blasting head, two opposite, extreme outer positions in which the transversely outer edge of the housing 6 is aligned with either of the outer edges of the left and right tracks 4 and a central position in which the housing is located centrally between the tracks. The positioning of the blasting head can thus be adjusted by removing the pin 121 and sliding the housing to which ever of the three selected positions is appropriate in order to adjust the machine for the presence of standpipes in its path as previously described.

Another advantage of the mounting described is that the housing 6 blasting head, comprising the throwing wheel 8 and the motor 10 for the throwing wheel, comprises a unit which can be removed and replaced by another similar unit when the original unit becomes too worn for further use. To do so merely requires freeing the pin 121 and sliding the entire unit laterally off the guide tracks 117. The ease with which one blasting unit can be removed and a replacement mounted on the guide tracks minimizes the downtime associated with changing a worn blasting head. For example, change over times of approximately 5 minutes can be achieved whereas prior machines usually involved several hours of down-time when it was necessary to replace a worn blasting head. The electrical connections to the motor 10 can be provided with suitable plug-in connections so that it can be readily connected to electrical power once the new blasting head has been installed.

The upper end of the casing 98 surrounding the screw conveyor is connected to a transversely extending, downwardly slanted, rectangular chute 122 (FIG. 1), which extends telescopingly into the inlet box 12 through a snugly, sealingly fitting opening in the side thereof. During transverse movement of the blasting head, the transverse chute 122 telescopes into and out of the inlet housing 12 to accommodate the lateral motion of the blasting head 5. The chute 122 is connected to the casing 98 by a rotatable joint 123 (FIG. 3) to accommodate the swinging vertical movement of the chute as it telescopes into and out of the inlet box.

In order to direct the rebounding spent grit from the housing into the interior space beneath the vehicle 2, even though the blasting head may be transversely displaced, two pivotal interior vertical walls 124 (FIG. 7) are provided. Each interior wall 124 is mounted for pivotal motion about a vertical axis to the rear end wall of the housing 6, extending vertically through the region adjacent the skirt. Each interior wall (FIG. 7) has its free rear end, spring biased into contact with the interior of the adjacent vertical sidewall of the vehicle 2. When the blasting head is moved transversely beyond the lateral sideline of the vehicle (e.g., see FIG. 8), the interior walls 124 guide the rebounding spent grit into the region beneath the vehicle, where it can be picked up by the belt 14.

Provision is also made for adjusting the vertical spacing of the endless belt magnetic pickup above the surface to be cleaned. Such spacing may need to be varied depending upon the size of grit being utilized and the degree of roughness or irregularity of the surface being cleaned. For this purpose, each of the previously mentioned sidewalls 16 is supported by two longitudinally spaced, sideward projections 125 and 126 (FIG. 3) adjacent its lower end. At its outer end, each of the projections 124 and 126 is connected to a vertically extending supporting rod 128 passing through an opening in a horizontal beam 130 secured to the side of the vehicle 2. Above the beam, each of the supporting rods 128 is threaded and engages a supproting nut 134. By tightening or loosening the nuts 134, the sidewalls 16 can be raised and lowered and hence the vertical spacing between the pickup region 24 of the endless belt and the underlying work surface can be selectively adjusted. As the frame is raised and lowered, the plate 40 slides over the plate 42 to allow for the vertical height adjustment.

In a second embodiment of the invention, the grit blasting machine can be constructed as a so-called line striping machine for grit blasting the traffic lines striped on a highway. The line striping machine embodiment is generally similar to the first embodiment already described with the exception that the blasting head 5 is disposed with its lengthwise axis aligned with the lingitudinal axis of the vehicle 2 instead of transversely thereto. It is also necessary that an additional supporting arm 140 be mounted on the shorter vertical side of the housing 6 facing towards the vehicle so that it can connect to the supporting wall 116 on the vehicle through similar guide tracks and slide rods 117 and 118 to those utilized in the first embodiment. Alternatively, the line striping machine may be of a fixed head variety in which the guides and bushings are eliminated and the blasting head is fixedly secured to the vehicle in lengthwise alignment therewith without the possibility of transverse motion relative to the vehicle.

A third embodiment of the grit blasting machine is shown in FIGS. 10 and 11. The third embodiment is similar in its construction to the first embodiment already described except that in place of a single endless belt conveyor, two, upper and lower, endless belt conveyors 160 and 161, respectively, are utilized. The lower conveyor 161 extends transversely of the direction of motion of the vehicle 2 and is supported at its opposite transverse ends by longitudinally extending, horizontal, left and right rollers 162 and 164 supported for rotation by portions of the structure of the vehicle 2. The total length of the lower conveyor 160 between the rollers 162 and 164 is generally equal to the transverse width of the housing 6 enclosing the blasting head. One of the rollers is driven by a motor (not shown) in such a direction that the conveyor moves upwardly around the left roller 162.

As the vehicle progresses over the surface, the lower conveyor 161 passes over generally the same portions of the surface as have already been passed over by the blasting head. The configuration of the lower conveyor 161 is generally that of a flattened loop having upper and lower horizontal portions. The lower horizontal portion of the lower conveyor 161 is spaced closely above the surface being cleaned and constitutes a pickup region. Fixedly connected by suitable supporting structure to adjacent portions of the interior structure of the vehicle 2 are a plurality of permanent magnets (not shown), similar to those utilized in the first embodiment, extending along and closely above the inner surface of the lower portion of the loop in the conveyor 161. The magnets exert a sufficient attraction upon the grit particles lying on the surface beneath the lower conveyor 160 to attract them onto the lower surface of the conveyor. The previously mentioned left roller 162 is also a permanent magnet and the conveyor belt 161 passes upwardly around the roller 162 with the particles being retained on the belt by magnetic attraction during passage around the roller. In the upper horizontal portion of the loop, the conveyor passes over underlying horizontal supporting structure (not shown) which is nonmagnetic so that the grit particles, although supported against gravity on the upper surface of the lower conveyor, are no longer retained on it by magnetic attraction.

The upper conveyor 160 is spaced above and extends rearwardly at right angles to the lower conveyor. The forward end of the upper conveyor 160 overlaps the transverse downstream end of the upper surface of the lower conveyor 161. The overlapped portion of the upper surface of the lower conveyor 161 constitutes a release region. The upper conveyor 161 is supported on transversely extending, longitudinally spaced, forward and rear parallel rollers 172 and 174, respectively, rotatably supported by adjacent portions of the structure of the vehicle 2. One of the rollers is driven by an electric motor (not shown) in such a direction that the upper surface of the upper conveyor is traveling in a rearward direction.

Mounted closely above the inner surface of the lower portion of the loop of the upper conveyor 160 are a plurality of permanent magnets 176. The magnets 176 exert a sufficient magnetic attraction to cause the grit lying on the release region of the lower conveyor to be attracted onto the lower portion of the upper conveyor (which constitutes a second pick-up region) and held there. The forward roller 172 is also made of permanently magnetized material so that the grit is carried upwardly around the forward roller 172 onto the upper horizontal portion of the conveyor 160. The underside of the upper conveyor 160 is supported horizontally by non-magnetized supporting structure 178 so that the grit is retained thereon by gravity but without magnetic attraction. As the grit passes downwardly around the rear roller 174 (which constitutes a second release region), it becomes separated from the conveyor by gravity and centrifugal force and falls into a collecting chamber 180. From the collecting chamber 180, the grit is removed by a vertical conveyor 44 and is recirculated to the blasting head in the same manner as already described for the first embodiment.

The advantage of the third embodiment is that it is not necessary to have a magnetic roller extending the full transverse width of the vehicle. Such magnetic rollers tend to come in standard sizes which are less expensive than having a custom-built roller of relatively greater length than normally made. By using two conveyors, it is possible to utilize standard length rollers and effect a significant saving in manufacturing cost.

Each of the three embodiments of the invention described utilizes a similar locomotion and drive system. Each track includes a longitudinally extending endless chain comprised of alternating inner and outer links 190 and 192, respectively, pivotally connected together by transverse pins 193. Fixedly connected to each of the links 190 and 192 are a plurality of transversely extending, generally rectangular track plates 194. Each track 4 at its forward and rear ends pass around two toothed sprockets 200 and 204 rotatably connected with the vehicle. The teeth on the sprockets pass between the inner links 190 and drivingly engage the pins 193.

Each track is driven through its rear sprocket 204 by an individual track motor 206. (FIG. 3) drivingly connected to the associated drive sprocket 204 through a reduction gear assembly 208. The motors 206 are reversible, variable speed electric motors so that the speed and direction of each of the tracks can be individually controlled. By driving the left and right tracks at different speeds or in different directions, the vehicle can be turned, while by driving them at the same speed and in the same direction, the vehicle can be caused to move in a straight line. Suitable electric circuitry (not shown) including a speed and direction controller for each of the electric motors 206, a power cable to an external power source such as an adjacent diesel electric generator set, and a control box which may be hand-held or mounted on the vehicle are provided for motor speed and direction control. In addition, the control box includes suitable conventional control circuitry for each of the other electric motors utilized in the same device to drive the belts, the screw conveyor, the throwing wheel, and the other motor driven components previously described.

The weight of the vehicle is transferred to the tracks through two spaced bogie assemblies 212 for each of the tracks. Each bogie assembly includes a vertical column 214 (FIGS. 1 and 2) connected up at its upper end to the body of the vehicle 2. Connected to the lower end of each of the columns 214 for vertical pivoting motion about a horizontal axis is a generally triangular stabilizing plate 216 provided with two pairs of bogie wheels 218 mounted on axles 220 positioned adjacent each lower corner of the stabilizing plate. The bogie wheels 218 transfer the weight of the vehicle to the underlying track plates 194 as they pass beneath the bogie wheels.

In another significant aspect of the invention, the stabilizer plate 220 extends slidably and snugly between the adjacent inner links 190. The lower horizontal edge of each stabilizer plate 216 is spaced below the upper edges of the inner links 190 but above the pins 193 to avoid interference with the latter. The length of each stabilizer plate is such that it extends longitudinally across at least two at a time of the pairs of inner links 190. The stabilizer plate is connected to its associated column 214 in such a way that it cannot twist laterally out of longitudinal alignment with the longitudinal axis of the track. As the vehicle commences a turn, there is a tendency for the vehicle to turn relative to the tracks which could buckle or twist the track. However, the stabilizing force exerted by the side faces fo the stabilizer plates 26 against the adjacent side surfaces of the inner links contacting the stabilizer plates ensures that the tracks 4 turn with the vehicle, thus avoiding such a problem.

Although the invention has been described with reference to a preferred embodiment and an alternative embodiment, it will be appreciated by those skilled in the making and design of grit blasting machines that many obvious modifications, deletions, substitutions and other changes may be made without departing from the spirit of the invention disclosed herein and defined in the appended claims.

I claim:

1. A grit blasting machine for removing scale from a surface to be cleaned utilizing particles of metal grit susceptible to magnetic attraction, the grit blasting machine comprising:
    a vehicle adapted for motion along the surface in a forward direction extending longitudinally of the vehicle, said vehicle having forward and rear ends;
    a housing having an opening facing the surface;
    means for mounting said housing on the forward end of said vehicle with said opening positioned forwardly of said vehicle;
    blasting means connected to said housing for projecting the grit through said opening against the surface to remove the scale therefrom;
    at least one endless belt formed from non-magnetic, magnetically permeable material;
    means connected with said vehicle for supporting said belt in an endless path and for driving said belt peripherally along said path, said path including,
        a pickup region facing toward the surface in spaced adjacent relation thereto, continued motion of said vehicle moving said pickup region successively over portions of the surface travelled over by said housing,
        a release region;
    magnetic means connected to said vehicle for magnetically attracting grit present on the surface facing said pickup region onto said belt and for holding the grit on said belt until the grit reaches said release region, the portions of said belt passing through said release region not being subjected to sufficient magnetic force to hold the grit on said belt by magnetic attraction; and
    means for causing the grit to become separated from said belt during passage through said release region.

2. A grit blasting machine as defined in claim 1, further including:
    recirculating means connected to said vehicle receiving the grit separating from said belt in said release region for recirculating the grit to said blasting means.

3. A grit blasting machine as defined in claim 1, wherein said means for supporting and driving said belt includes:
    a frame connected to said vehicle;
    a plurality of spaced, rollers generally parallel to the surface rotatably connected with said frame supporting said belt for peripheral motion along said path; and
    means contacting said belt to drive it peripherally along said path.

4. A grit blasting machine as defined in claim 3, further including:
    adjustable supporting means connecting said frame to said vehicle for adjusting motion of said frame relative to said vehicle to selectively vary the spacing of said pickup region from the surface 5. A grit blasting machine as defined in claim 2, wherein the projection of the grit against the surface also causes the creation of airborne dust, the grit blasting machine further including:

a hollow interior space within said vehicle open at its lower end thereof facing towards the surface, the interior of said housing communicating with said interior space of said vehicle, said belt being positioned within said interior space;

a flexible, resilient skirt extending peripherally around said vehicle into contact with the surface for preventing escape of dust, grit, and scale from said housing and from said interior space within said vehicle; and suction means for applying suction to said interior space to withdraw the dust therefrom.

6. A grit blasting machine as defined in claim 2, further including, scale separating means connected with said recirculating means for separating detached scale from the grit before the grit is redelivered to said blasting means.

7. A grit blasting machine as defined in claim 6, wherein said scale separating means includes:

a first screen connected with said recirculating means having a mesh size such that grit can pass through said first screen but scale particles larger than the grit particles are retained on said first screen; and a second screen connected with said recirculating means downstream of said first screen, receiving the particles passing through said first screen, said second screen having a mesh size smaller than the particles of grit to cause the grit particles to be retained on said second screen wherein scale particles smaller than the mesh of said second screen pass therethrough, said recirculating means delivering the grit retained on said second screen to said blasting means.

8. A grit blasting machine as defined in claim 1, wherein said housing and said blasting means are connected together to form a unit, said unit being removably connected with said vehicle to enable said unit to be selectivelys removed and replaced with another such unit.

9. A grit blasting machine as defined in claim 1, further including:

adjustable mounting means supporting said housing on said vehicle for limited, selectively adjustable motion in opposite, transverse directions relative to said vehicle.

10. A grit blasting machine as defined in claim 2, wherein said recirculating means includes:

collecting means connected to said vehicle for collecting the grit separating from said belt in said release region;

a hopper connected to said vehicle spaced from said collecting means, said hoper having an opening for the passage of grit outwardly from said hopper;

a first conveyor connected to said vehicle for conveying grit from said collecting means to said hopper; and a second conveyor connected to said vehicle positioned to receive the grit from said hopper opening for conveying the grit therefrom to said blasting means.

11. A grit blasting machine as defined in claim 10, wherein said second conveyor includes:

a generally tubular conduit connected to said housing, said conduit communicating at one of its ends with said hopper opening and at its other end with said blasting means;

a screw conveyor mounted concentrically in said conduit for moving the grit along said conduit from said hopper to said blasting means; and a tubular mesh screen in contact with the flights of said screw conveyor and spaced from the interior of said conduit, said tubular screen having a mesh size such that the grit is retained within said tubular screen while particles of smaller size than the grit pass outwardly through said tubular screen.

12. A grit blasting machine as defined in claim 10, further including:

a hopper screen positioned between said first conveyor and said hopper, said hopper screen having a mesh size such that the grit can pass through the mesh into the hopper while particles larger than the grit are retained on said hopper screen.

13. A grit blasting machine as defined in claim 5, wherein said suction means includes:

a suction pump mounted on said vehicle having a suction inlet and an outlet;

duct means connecting said suction inlet with said interior space in said vehicle for application of suction thereto; and a movable dust collector releasably hitched to and towed by said vehicle, said dust collector connected to the outlet of said suction pump.

14. A grit blasting machine as defined in claim 1, wherein said housing includes:

a vertically and laterally extending, generally rectangular enclosure provided with said opening at its lower end:

and wherein said blasting means includes:

a throwing wheel mounted within said enclosure for rotation about a horizontal, longitudinally extending axis;

means for rotating said throwing wheel; and an inlet duct extending through said enclosure for feeding grit against said throwing wheel to be flung centrifugally downwardly thereby against the surface.

15. A grit blasting machine as defined in claim 14 said mounting means including:

a first supporting structure connected to said enclosure;

a second supporting structure connected to said vehicle in adjacent relation to said supporting structure connected to said enclosure;

bearing means connected to said supporting structures mounting said enclosure for transverse sliding motion relative to said vehicle; and adjusting means connected to at least one of said supporting structures for selective transverse positioning of said enclosure relative to said vehicle.

16. A grit blasting machine as defined in claim 1 wherein said magnetic means includes:

a plurality of permanent magnets connected to such vehicle positioned internally of said belt in close proximity thereto extending along said pickup region and from said pickup region to said release region.

17. A grit blasting machine as defined in claim 16 wherein at least one of said permanent magnets includes:

a permanently magnetized roller rotatably mounted in said vehicle between said pickup region and said release region, said belt travelling at least partially around said permanently magnetized roller.

18. A grit blasting machine as defined in claim 1, wherein said means for separating the grit from said one belt includes;
- a second endless flexible belt formed from nonmagnetic, magnetically permeable material;
- second means connected to said vehicle for supporting said belt in a second endless path and for driving said second belt peripherally along said second path, said second path including,
  - a second pickup region facing towards said release region of said one belt in spaced adjacent relation thereto,
  - a second release region,
- second magnetic means connected to said vehicle for magnetically attracting grit positioned on the release region of said one belt onto said second belt and for holding the grit on said second belt until the grit reaches said second release region, the portions of said second belt passing through said second release region not being subjected to sufficient magnetic force to hold the grit on said second belt by magnetic attraction.

19. A grit blasting machine as defined in claim 18, wherein,
- said one belt is configured as a generally horizontal, flattened first loop with said pickup and release regions constituted by vertically spaced, generally horizontal, lower and upper portions of the first loop, respectively; and
- said second belt is configured as a generally horizontal, second flattened loop with said second pickup and said second release regions constituted by vertically spaced, generally horizontal, lower and upper portions of the second loop, respectively; the lower portion of the second loop at least partially overlapping the upper portion of the first loop.

20. A grip blasting machine as defined in claim 18, further including,
- a leading end of said second belt positioned in overlapping relation to said one belt, said second belt travelling around said leading end thereto in an upward direction from said second pickup region to said second release region, said second magnetic means retaining the grit on said second belt during passage through said second end;
- a trailing end of said second belt spaced from said leading end extending beyond said one belt, said second belt travelling in a downward and generally circular path around said trailing end thereby causing the grit particles to become separated from said second belt; and
- a collecting chamber extending partially around and beneath said trailing end of said second belt to collect the grit therefrom.

21. A grit blasting machine as defined in claim 20, wherein said second belt extends in generally perpendicular relation to said one belt.

22. A grit blasting machine as defined in claim 20, wherein said one belt travels peripherally in a direction extending transversely of he direction of movement of said vehicle and said second belt travels peripherally in a direction parallel to the direction of motion of said vehicle.

23. A grit blasting machine as defined in claim 20, further including:
- recirculating means connected to said vehicle for receiving the grit from said collecting chamber and redelivering it to said blasting means.

24. A grit blasting machine as defined in claim 19, wherein said magnetic means includes,
- a first permanent magnet fixedly connected to said vehicle positioned internally of said belt extending along and closely above the lower horizontal portion of the loop defined by said one belt;
- a first roller of permanently magnetized material positioned internally of said one belt extending traversely thereof at the trailing end of said pickup region in the direction of peripheral travel of said belt;

and wherein said second magnetic means includes,
- a second permanent magnet fixedly connected to said vehicle positioned internally of said second belt extending along and closely above the lower horizontal portion of the loop defined by said second belt; and
- a second roller of permanently magnetized material positioned internally of said second belt extending transversely thereof at the trailing end of said second pickup region in the direction of peripheral travel of said second belt.

25. A grit blasting machine as defined in claim 1, wherein said belt is flexible and wherein said means for supporting said belt includes:
- a pair of spaced, parallel supporting rollers positioned an equal distance from the surface, said belt contacting said supporting rollers on its inner surface and extending at least partially around said supporting rollers, the portion of said belt extending between said supporting rollers constituting said pickup region;

and wherein said means for causing the grit to become separated from said belt includes,
- at least one additional roller spaced from said rollers, said belt travelling over and at least partially around said additional roller, the portion of said belt passing around said additional roller constituting said release region.

26. A grit blasting machine as defined in claim 25, adapted for cleaning horizontal surfaces wherein,
- said supporting rollers support said belt generally horizontally in the pickup region in spaced adjacent relation to the surface,
- said additional roller being spaced above said supporting roller in parallel relation thereto, said belt travelling downwardly and at least partially around said additional roller to cause the grit to separate from said belt under the combined influence of gravity and centrifugal force.

27. A grit blasting machine as defined in claim 26, further including,
- recirculating means connected to said vehicle positioned to collect the grit separating from said belt for recirculating the grit to said blasting means.

28. A grit blasting machine as defined in claim 25, wherein said magnetic means includes,
- a first permanent magnet fixedly connected to said vehicle positioned internally of said belt extending along and closely above said belt in said pickup region;
- one of said supporting rollers positioned at the trailing end of said pickup region in the direction of peripheral motion of said belt being permanently magnetized; and
- a second permanent magnet fixedly connected to said vehicle positioned internally of said belt extending from said one of said supporting rollers toward said additional roller.

29. A grit blasting machine as defined in claim 26, further including,
first and second intermediate rollers rotatably connected with said vehicle in spaced parallel relation to said additional roller, said first and second intermediate rollers contacting the interior and exterior surfaces of said belt, respectively, on a level with the upper and lower surfaces of said additional roller thereby causing said belt to pass around said additional roller in a U-shaped configuration with the arms of the U extending horizontally.

30. A grit blasting machine for removing scale from a surface to be cleaned utilizing particles of metal grit susceptible to magnetic attraction, the grit blasting machine comprising:
a vehicle adapted for motion along the surface;
a housing mounted on said vehicle having an opening facing the surface;
blasting means connected to said housing for projecting the grit through said opening against the surface to remove the scale therefrom;
a first, endless, flexible belt formed from nonmagnetic, magnetically permeable material;
first means connected to said vehicle for supporting said belt in an endless path and for driving said belt peripherally along said path, said path including:
a pickup region facing towards the surface in spaced adjacent relation thereto, continued motion of said vehicle moving said pickup region successively over the portions of said surface travelled over by said housing,
a first release region;
first magnetic means connected to said vehicle for magnetically attracting grit lying on the surface facing said pickup region onto said first belt and for holding the grit on said first belt until the grit reaches said first release region, the portions of said first belt passing through said first release region not being subjected to sufficient magnetic force to hold the grit on said first belt by magnetic attraction;
a second endless belt formed from nonmagnetic, magnetically permeable material;
second means connected with said vehicle for supporting said second belt in an endless path and for driving said second belt peripherally along said second path, said second path including:
a second pickup region facing towards said release region of said first belt in spaced adjacent relation thereto,
a second release region; and
second magnetic means connected to said vehicle for magnetically attracting grit positioned on said first belt in the first release region onto said second belt and for holding the grit on said second belt until the grit reaches said second release region, the portions of said second belt passing through said second release region not being subjected to sufficient magnetic force to hold the grit on said second belt by magnetic attraction.

31. A grit blasting machine las defined in claim 30, wherein said second means for supporting said second belt includes,
means guiding said second belt in a downward circular arc through said second release region to cause the grit on said second belt to become separated therefrom;
the grit blasting machine further including,
means connected with said vehicle for recirculating the grit separated from said second belt to said blasting means.

32. A grit blasting machine for removing scale from a surface to be cleaned utilizing particles of metal grit susceptible to magnetic attraction, the grit blasting machine comprising:
a vehicle adapted for forward motion in a longitudinal direction, along the surface;
a housing having a downward opening facing the surface;
traverse means mounting said housing on the forward end of said vehicle for selectively adjustable transverse motion of said housing relative to said vehicle; and
blasting means connected to said housing for projecting the grit downwardly through said opening against the surface to remove the scale therefrom.

33. A grit blasting machine as defined in claim 32, further including,
a pair of driven endless articulated tracks supporting said vehicle for motion along the surface.

34. A grit blasting machine as defined in claim 32 further including,
recovery means for recovering the grit projected against the surface, and for recirculating the grit to said blasting means.

35. A grit blasting machine as defined in claim 34, wherein said recovery means includes,
magnetic means connected to said vehicle for picking up the grit from the surface by magnetic attraction; and
conveyor means connected to said vehicle for conveying the grit picked up by said magnetic means to said blasting means.

36. A grit blasting machine as defined in claim 32, wherein said vehicle is generally rectangular with said forward end extending generally transversely, said vehicle further including:
a hollow interior space within said vehicle open at the lower end thereof facing towards the surface;
a flexible, resilient first skirt extending peripherally around said vehicle except along said forward end, said first skirt extending vertically into contact with the surface for preventing escape of dust, grit and scale from said interior space;
a flexible, resilient second skirt extending peripherally around said housing except along a transverse end thereof facing said forward end of said vehicle, said second skirt extending vertically into contact with the surface for preventing escape of dust, grit and scale from said interior space;
first and second expansible seal means extending between and connected to said vehicle and said housing at opposite transverse ends thereof for permitting transverse motion of said housing relative to said vehicle while preventing escape of dust, grit and scale from a region between said housing and said interior space.

* * * * *

UNITED STATES PATENT AND TRADEMARK OFFICE
CERTIFICATE OF CORRECTION

PATENT NO. : 3,981,104
DATED : September 21, 1976
INVENTOR(S) : Alfred J. Dreher It is certified that error appears in the above-identified patent and that said Letters Patent are hereby corrected as shown below:

Column 4, line 27, delete "crosssection" and insert therefor --cross-section--.

Column 6, line 54, delete "in" and insert therefor --is--;

line 58, delete "superstructure" and insert therefor --of--;

line 67, delete "fo" and insert therefor --of--.

Column 8, line 41, delete "fo" and insert therefor --of--;

line 48, delete "damage" and insert therefor --damaged--.

Column 9, line 17, delete "fo" and insert therefor --of--.

Column 11, line 32, delete "lingitudinal" and insert therefor --longitudinal--.

Column 13, line 12, delete "206." and insert therefor --206--;

line 61, delete "fo" and insert therefor --of--.

UNITED STATES PATENT AND TRADEMARK OFFICE
CERTIFICATE OF CORRECTION

PATENT NO. : 3,981,104
DATED : September 21, 1976
INVENTOR(S) : Alfred J. Dreher It is certified that error appears in the above-identified patent and that said Letters Patent are hereby corrected as shown below:

In the Claims

Claim 4, line 6, insert --.-- after "surface".

Claim 8, line 5, delete "selectivelys" and insert therefor --selectively--.

Claim 18, line 3, delete ";" and insert --:--.

Claim 20, line 1, delete "grip" and insert therefor --grit--.

Claim 22, line 3, delete "he" and insert therefor --the--.

Claim 31, line 1, delete "las" and insert therefor --as--.

Signed and Sealed this

Twenty-first Day of December 1976

[SEAL]

Attest:

RUTH C. MASON
Attesting Officer

C. MARSHALL DANN
Commissioner of Patents and Trademarks